(12) United States Patent
Oud et al.

(10) Patent No.: US 12,741,261 B2
(45) Date of Patent: Sep. 22, 2026

(54) SHELL-AND-TUBE HEAT EXCHANGER, METHOD OF EXCHANGING HEAT AND USE OF HEAT EXCHANGER

(71) Applicant: TECHNIP ENERGIES FRANCE, Nanterre Cedex (FR)

(72) Inventors: Peter Oud, Zoetermeer (NL); Esmaeil Mahmoudi Namarvar, The Hague (NL)

(73) Assignee: TECHNIP ENERGIES FRANCE SAS, Nanterre (FR)

( * ) Notice: Subject to any disclaimer, the term of this patent is extended or adjusted under 35 U.S.C. 154(b) by 810 days.

(21) Appl. No.: 18/020,617

(22) PCT Filed: Aug. 9, 2021

(86) PCT No.: PCT/EP2021/072144
§ 371 (c)(1),
(2) Date: Feb. 9, 2023

(87) PCT Pub. No.: WO2022/034013
PCT Pub. Date: Feb. 17, 2022

(65) Prior Publication Data

US 2023/0330616 A1 Oct. 19, 2023

(30) Foreign Application Priority Data

Aug. 10, 2020 (EP) .................................... 20290061

(51) Int. Cl.
*B01J 19/00* (2006.01)
*C10G 9/20* (2006.01)
(Continued)

(52) U.S. Cl.
CPC ............ *B01J 19/0013* (2013.01); *C10G 9/20* (2013.01); *F28D 7/12* (2013.01); *F28D 7/1676* (2013.01);
(Continued)

(58) Field of Classification Search
CPC .... B01J 19/00; B01J 19/0006; B01J 19/0013; B01J 2219/00; B01J 2219/00049;
(Continued)

(56) References Cited

U.S. PATENT DOCUMENTS 948,835 A * 2/1910 Walter ...................... F28F 9/22 165/160
4,479,869 A 10/1984 Petterson et al.
(Continued)

FOREIGN PATENT DOCUMENTS

CN 100386586 C 5/2008
CN 106839828 A 6/2017
(Continued)

*Primary Examiner* — Natasha E Young
(74) *Attorney, Agent, or Firm* — Troutman Pepper Locke LLP; Gabrielle L. Gelozin

(57) ABSTRACT

Aspects of the present invention relate to a shell-and-tube heat exchanger (101), a method of using said heat exchanger, and to a hydrocarbon cracking furnace system comprising said heat exchanger. The shell-and-tube heat exchanger comprises at least: a spiral baffle (7) arranged to provide a helical flow path through the shell body (103) and an outlet collector pipe (4) that supports the spiral baffle and that extends substantially coaxially within the shell body, wherein the outlet collector pipe is mounted to and passes through a second tubesheet (106) bordering the shell body (103) on one terminal end, and wherein the outlet collector pipe (4) is separated from a first tubesheet (105) on the opposing terminal end by a gap that allows a shell-side fluid (F2) to exit the shell body (103).

18 Claims, 4 Drawing Sheets

(51) Int. Cl.

| | |
|---|---|
| ***F28D 7/12*** | (2006.01) |
| ***F28D 7/16*** | (2006.01) |
| ***F28D 21/00*** | (2006.01) |
| ***F28F 9/22*** | (2006.01) |

(52) U.S. Cl.
CPC ....... *F28F 9/22* (2013.01); *B01J 2219/00092* (2013.01); *B01J 2219/00103* (2013.01); *B01J 2219/00105* (2013.01); *F28D 2021/0075* (2013.01); *F28F 2009/228* (2013.01)

(58) Field of Classification Search
CPC .... B01J 2219/00051; B01J 2219/00074; B01J 2219/00087; B01J 2219/00092; B01J 2219/00103; B01J 2219/00105; C10G 9/00; C10G 9/002; C10G 9/14; C10G 9/18; C10G 9/20; F28D 7/00; F28D 7/10; F28D 7/12; F28D 7/16; F28D 7/163; F28D 7/1669; F28D 7/1676; F28D 2021/00; F28D 2021/0019; F28D 2021/0075; F28F 9/00; F28F 9/22; F28F 2009/222; F28F 2009/228
See application file for complete search history.

(56) References Cited

U.S. PATENT DOCUMENTS

| | | | | |
|---|---|---|---|---|
| 5,314,009 | A | 5/1994 | Yates et al. | |
| 8,540,011 | B2 * | 9/2013 | Wang .................... | F28F 9/0131 165/145 |
| 2008/0190593 | A1 | 8/2008 | Wang et al. | |
| 2009/0301699 | A1 | 12/2009 | Karrs et al. | |
| 2020/0172814 | A1 | 6/2020 | Oud | |

FOREIGN PATENT DOCUMENTS

| | | | |
|---|---|---|---|
| EP | 3415587 | A1 | 12/2018 |
| WO | 2018/229267 | A1 | 12/2018 |
| WO | 2021/052642 | A1 | 3/2021 |

* cited by examiner

SHELL-AND-TUBE HEAT EXCHANGER, METHOD OF EXCHANGING HEAT AND USE OF HEAT EXCHANGER

CROSS REFERENCE TO RELATED APPLICATIONS

This application is the national phase under 35 U.S.C. § 371 of PCT International Application No. PCT/EP2021/072144, now WO 2022/034013, filed Aug. 9, 2021, which claims the benefit of and priority to European Patent Application Serial No. 20290061.9 filed Aug. 10, 2020. The entire contents of these patent applications are hereby incorporated by reference herein.

TECHNICAL FIELD AND BACKGROUND

The present disclosure relates to a to a shell-and-tube heat exchanger, a method to exchange heat between a first fluid and a second fluid, and to a use of the heat exchanger as a transfer line exchanger in a hydrocarbon cracking furnace system.

Shell-and-tube heat exchangers constitute a popular class of heat exchangers for example due to a broad applicability within a wide range of pressures and temperatures. Shell-and-tube type heat exchangers are commonly used in power industry and petrochemical industry applications. Typically shell-and-tube heat exchangers comprise one or more heat exchange tubes mounted inside a cylindrical shell allowing two fluids to exchange heat, the first fluid flowing through the tubes themselves while the second flows over the outside of the tubes.

A common problem with known shell-and-tube heat exchangers, for example of the type wherein the shell space comprises longitudinal and/or transvers baffles, is that they exhibit uneven flow distribution, in particular on the shell side of the heat exchangers. Uneven flow distribution areas within one side may result in uneven, slow, or even insufficient heat transfer to the fluid at the other side. Uneven flow distribution and accompanying uneven heat exchange, is typically a result of disturbances to the flow path within the shell. This is typically expressed in the form of eddies being generated as a fluid passes over or under a trailing edge of a baffle. Alternatively, or in addition, flow profiles within the shell may be particularly disturbed as the fluid enters or leaves the shell, e.g. at the inlet or outlets. As a result of one or more of the above disadvantages, properties of a product and/or feedstock or process medium in the tube side and/or shell side may degrade. Alternatively, or in addition, heat exchanger performance may degrade, e.g. due to fouling caused by process flow mal-distribution or process medium degradation, for instance due to overheating as a result of sub-optimal heat transfer.

To improve flow distribution, it has been proposed to provide an exchanger with a spiral or helical baffle. US2009301699 discloses a heat exchanger including a shell having a fluid inlet and a fluid outlet and a plurality of baffles mounted in the shell to guide the fluid into a helical flow pattern through the shell. US200880190593 discloses a single shell-pass as well as a multiple shell-pass shell-and-tube heat exchanger including a shell having a fluid inlet and a fluid outlet with a non-continuous helical baffle, e.g. spliced baffle portions. Disadvantageously, ascertaining even flow distribution in shells of heat exchangers according to the types as disclosed in US2009301699 and US200880190593 remains challenging, in particular around a center line, e.g. along a center section of the shell proximate to opposing ends of spliced baffles. To improve flow distribution, it has been proposed to mount the baffle to a central support. CN100386586C discloses a heat exchanger including a shell having a fluid inlet and a fluid outlet comprising a central core to which a baffle is mounted to provide a helical flow path around said core. However, exchangers with such central core remain subject to disturbances near the shell inlet/outlet and further to mechanical stresses which are difficult to manage due to thermal expansion as a consequence of temperature differences between shell-side and tube-side walls, as the central core is supported by the adjacent tubesheets and cannot expand freely.

SUMMARY OF THE INVENTION

The present invention aims to provide a shell-and-tube heat exchanger that mitigates one or more of the above problems. Alternatively, or in addition, present invention aims to provide a shell-and-tube heat exchanger having an improved flow distribution and/or otherwise improved performance, e.g. in terms of fouling, over known shell-and-tube heat exchangers.

Aspects of the present invention relate to a shell-and-tube heat exchanger. In operation, the shell-and-tube heat exchanger facilitates heat exchange between a tube-side fluid and a shell-side fluid. The shell-and-tube heat exchanger comprises a first tubesheet; a second tubesheet; and a shell body. The shell body is fitted with a shell-side inlet nozzle. Opposing terminal ends of the shell body are bordered by the first and the second tubesheet. The shell-and-tube heat exchanger further comprises one or more heat exchange tubes. The one or more heat exchange tubes extend through the shell body from the first tubesheet to the second tubesheet, thus providing a fluid connection, e.g. for the tube-side fluid, through the heat exchange tubes across the shell body.

The shell-and-tube heat exchanger further comprises a spiral baffle. The spiral baffle is comprised inside the shell body, between the tubesheets, and follows a helical trajectory with its center of rotation substantially aligned with a center line of the shell body. Typically, the one or more heat exchange tubes pass through the spiral baffle. The spiral baffle is arranged to provide a helical flow path through the shell body downstream the shell-side inlet nozzle towards the first tubesheet.

In addition, the shell-and-tube heat exchanger is provided with an outlet collector pipe. The outlet collector pipe extends substantially coaxially within the shell body, i.e. with its center line substantially aligned with a center line of the shell body. The outlet collector pipe supports the spiral baffle at least substantially along the entire length of the baffle, such that the helical flow path is guided along an outer surface of the outlet collector pipe.

The outlet collector pipe is mounted to and passes through the second tubesheet. The outlet collector pipe is separated from the first tubesheet by a gap downstream the helical flow path. Preferably, the outlet collector pipe is disconnected from the first tubesheet. The gap allows a shell-side fluid, in operation, to enter an inlet of the collector pipe, which faces the first tubesheet across the gap. The shell-side fluid can pass through the outlet collector pipe to exit the shell body, e.g. via a shell-side outlet nozzle that is provided on a terminal end of the outlet collector pipe opposite to the collector pipe inlet.

A shell-and-tube heat exchanger comprising the spiral baffle and the outlet collector pipe according to the invention advantageously improves a velocity distribution, reduces size and/or number of eddies, and/or reduces a size and/or number of stagnant areas within the shell-and-tube heat exchanger during operation, in particular within its shell-side space.

Improved velocity distribution and/or reduced stagnant areas and eddies on the shell side reduce a degradation of a process medium, e.g. of a temperature sensitive medium such as a hot feedstock of a hydrocarbon cracking furnace. Such hot feedstock can be overheated in low velocity areas and relatively stagnant areas created by eddies by exchanging heat with a tube-side fluid to a point that feedstock conversion is high enough to create coke depositions on the hot tube surface, leading to heat exchanger fouling and consequently to efficiency reduction and ultimately to heat exchanger cleaning. In addition, improved flow distribution improves heat transfer between the shell-side fluid and the tube-side fluid and thus improves efficiency of the shell-and-tube heat exchanger and reduces equipment size. Alternatively, or in addition, the outlet collector pipe according to the invention allows for free thermal expansion or contraction during operation, e.g. due to thermal gradients between the tubes and the outlet collector pipe. This simplifies manufacturing as expansion bellows on the outlet collector pipe may be omitted. Bellows on the outlet collector pipe can further negatively affect shell-and-tube heat exchanger performance as bellows are prone to fouling and typically disturb the flow profile.

Further aspects of the present invention relate to a method of exchanging heat between a first fluid and a second fluid, the method comprising guiding a tube-side fluid through one or more of the heat exchange tubes of a shell-and-tube heat exchanger according to the invention; and guiding a shell-side fluid through the shell body of the shell-and-tube heat exchanger according to the invention.

The heat exchanger and method can be used to particular advantage in a chemical industrial application, preferably in a hydrocarbon cracking application, e.g. to quickly and effectively cool a cracked hydrocarbon process stream exiting a hydrocarbon cracking unit. For instance, in an advantageous embodiment the shell-and-tube heat exchanger (101) is used as a transfer line exchanger to cool a cracked hydrocarbon process steam from a radiant coil of a cracking furnace. The present invention accordingly also relates to a hydrocarbon cracking furnace system comprising the shell-and-tube heat exchanger according to the invention and to use of the shell-and-tube heat exchanger according to the invention as transfer line exchanger, e.g. in a hydrocarbon cracking system for the production of ethylene or other monomers.

BRIEF DESCRIPTION OF DRAWINGS

These and other features, aspects, and advantages of the apparatus, systems, use and methods of the present invention will become better understood from the following description, appended claims, and accompanying drawings wherein:

DESCRIPTION OF EMBODIMENTS

Figures 1A, 1B:
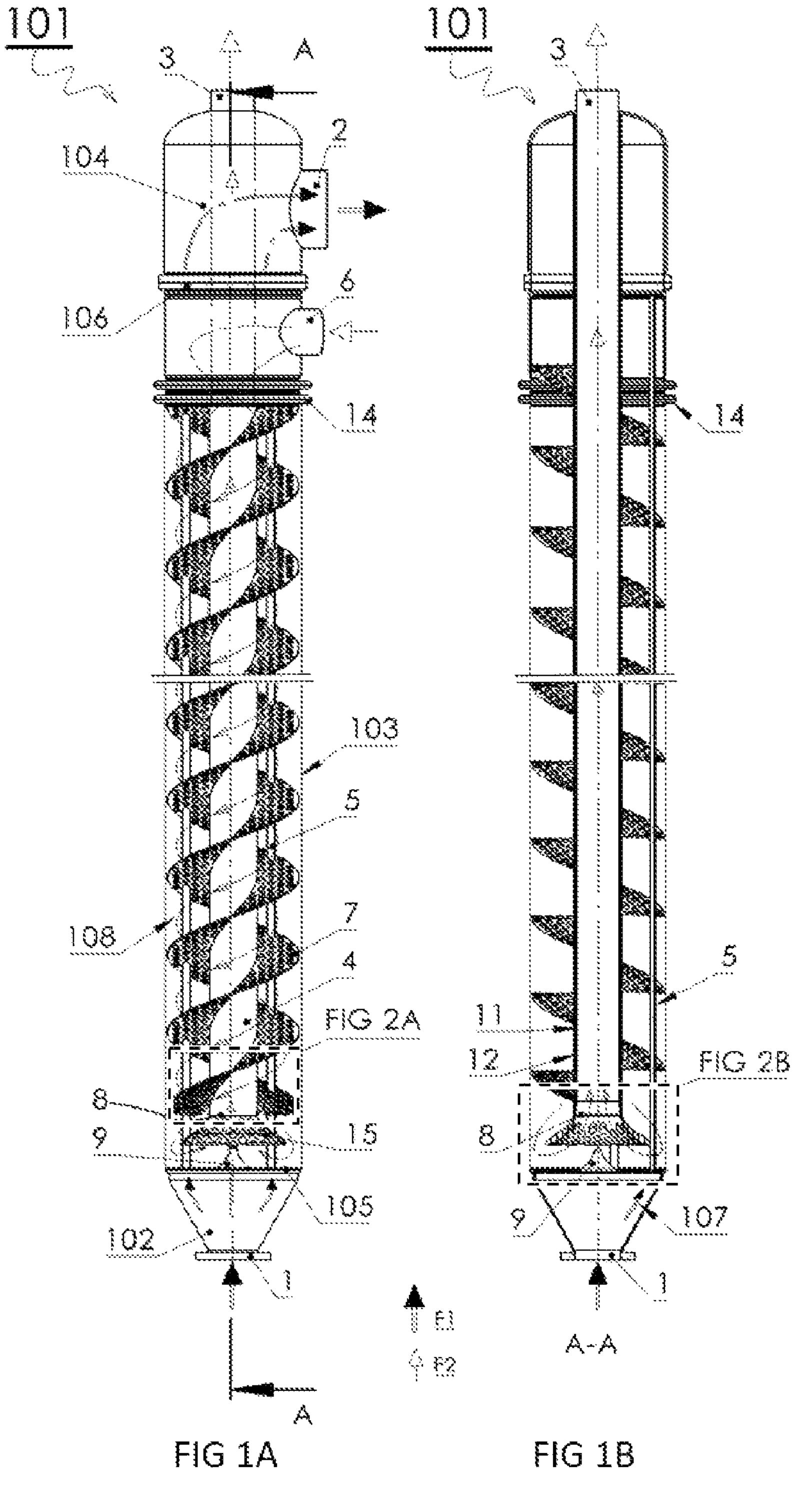
FIG. 1A and FIG. 1B illustrate a side view and a cross-sectional side view of an embodiment of the shell-and-tube heat exchanger.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise, it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity.

Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1A depicts a side view of an embodiment of the shell-and-tube heat exchanger 101, wherein part of the shell body 103 facing the viewing is omitted to allow a view of the interior. FIG. 1B provides a cross section side view along plane A-A of the embodiment shown in FIG. 1A. The embodiment as shown comprises a first tubesheet 105, a second tubesheet 106 and a shell body 103 with a shell-side inlet nozzle 6. Opposing terminal ends of the shell body 103 are bordered by the first tubesheet 105 and the second tubesheet 106. The shell-and-tube heat exchanger further comprises one or more heat exchange tubes 5 that extend through the shell body (103) from the first tubesheet (105) to the second tubesheet (106). The shell-and-tube heat exchanger further comprises a spiral baffle 7, an outlet collector pipe 4 with a collector pipe inlet 8 and a shell-side outlet nozzle 3. The spiral baffle 7 follows a helical trajectory with its center of rotation substantially aligned with a center line of the shell body. As shown, the spiral baffle is arranged to provide a helical flow path. e.g. for shell-side fluid F2, through the shell body 103 downstream the shell-side inlet nozzle 6 towards the first tubesheet 105.

Typically, the spiral baffle 7 extends for at least one full 360° rotation, a so-called pitch. Provision of at least one full rotation ensures that the flow path passes along each of the one or more heat exchange tubes 5 along its helical trajectory. Preferably, e.g. as shown, the spiral baffle 7 comprises multiple rotations, e.g. in excess of five rotations or more, e.g. in a range between 2 and 25 or in a range between 5 and 20. More rotations typically increase overall heat exchange between the tube-side and the shell-side fluids but increase manufacturing complexity. In addition, the shell-and-tube heat exchanger 101 comprises an outlet collector pipe 4 that extends substantially coaxially within the shell body and that supports the spiral baffle 7. Preferably, spiral baffle 7 is supported along its length by the outlet collector pipe 4, e.g. an outer surface of the outlet collector pipe 4, such that the helical flow path is guided along an outer surface of the outlet collector pipe 4. Preferably, the baffle is extended up to the shell body 103 as this reduces a leakage flow, e.g. of the shell-side fluid F2, between the baffle and the inner wall of the shell body 103. As shown the baffles are not directly connected to the shell, i.e. disconnected from the shell body 103 or not directly affixed to the shell. Preferably, the one or more heat exchange tubes are extended through the spiral baffle. Preferably, these tubes are arranged in multiple layers surrounding the outlet collector pipe 4 and extending towards the inner wall of the shell body 103, to occupy the available space between the shell body inner wall and the outer wall of the collector pipe as much as possible.

The outlet collector pipe 4, e.g. as shown, comprises a collector pipe inlet 8 and a shell-side outlet nozzle 3 provided on opposing ends of the outlet collector pipe 4 and providing a fluid connection therebetween along the pipe's hollow interior. The outlet collector pipe 4 is mounted to and passes through the second tubesheet 106 whereby the outlet collector pipe 4, e.g. the terminal end with the collector pipe inlet 8, is separated from the first tubesheet 105 by a gap downstream the helical flow path. This gap allows a shell-side fluid F2 to enter the inlet of the collector pipe 8, which collector pipe inlet 8 faces the first tubesheet 105 across the gap, and to exit the shell body 103 via the shell-side outlet nozzle 3 provided on a terminal end of the collector pipe 4 opposite to the collector pipe inlet 8. It will be appreciated that passing the outlet collector pipe 4 through the second tubesheet 106, e.g. as shown, allows the tube-side fluid F1 to exit the shell side without dead zones, eddies or stagnant areas, that can cause overheating and subsequent fouling of the heat exchanger shell side.

The shell-and-tube exchanger is preferably mounted vertically, as shown in FIGS. 1A and 1B. More preferably with the second tubesheet 106 located above the first tubesheet 105.

The outlet collector pipe 4 is connected to one tubesheet—preferably the top tubesheet in case of a vertical orientation—and disconnected from the other can advantageously freely expand or contract, e.g. due to a thermal gradient between the outlet collector pipe 4 and the external walls of the tubes 5, during operation. This advantageously allows omission of expansion bellows to the outlet collector pipe 4. Supporting the baffles by the outlet collector pipe 4 that is connected to a single tube sheet while keeping the baffles disconnected from the shell body 103 allows free thermal expansion in a direction between opposing tubesheets 105,106. In contrast, such bellows would be required to allow thermal expansion in embodiments wherein the outlet collector pipe 4 is connected on both ends to the shell-and-tube heat exchanger 101, e.g. to both tubesheets. Bellows on the outlet collector pipe 4 can further negatively affect heat exchanger performance as these bellows are prone to fouling and/or disturb the flow profile, e.g. of the shell-side fluid F2, along the helical flow path as well as within the outlet collector pipe 4.

The shell-side inlet nozzle 6 is preferably arranged as to inject a flow of shell-side fluid F2 close to or alongside the second tubesheet 106. To this end the shell-side inlet nozzle 6 is preferably fitted adjacent to or proximal to the second tubesheet 106, such as to inject the shell-side fluid F2 within a first pitch of the spiral baffle 7, e.g. as shown. Alternatively, the shell-side fluid F2 may be injected in a volume upstream the spiral baffle 7. Inserting the shell-side fluid F2 into a first pitch of the spiral baffle 7 reduces formation of a dead volume or dead space between the second tubesheet 106 and the baffle.

These features along with other or further features will be elucidated in more detail below with reference to FIGS. 1-3.

Figure 4:
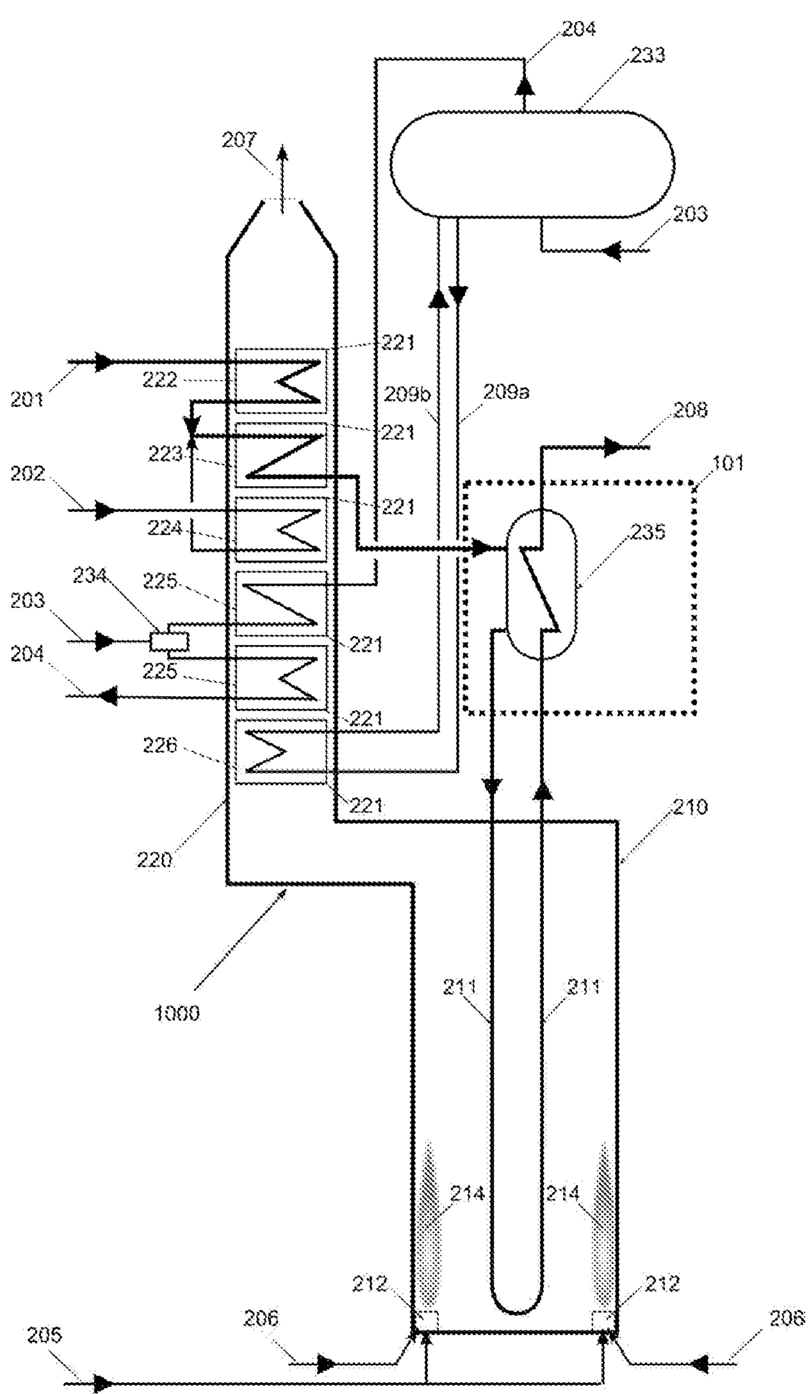
FIG. 4 illustrates a cracking furnace system for the production of ethylene and other monomers comprising a shell-and-tube heat exchanger.

It will be understood that the one or more heat exchange tubes extending through the shell body 103, across the shell-side space 108, from the first tubesheet 105 to the second tubesheet 106 typically pass through the spiral baffle 7, e.g. through one or more corresponding holes provided in the spiral baffle 7. Likewise, it will be understood that the shell-and-tube heat exchanger 101, preferably comprises a plurality of heat exchange tubes 5. To ease understanding of the internal structure of the shell-and-tube heat exchanger 101 only part of the heat exchange tubes 5 is depicted. Instead, presence of a plurality of tubes may be deduced from a plurality of holes 21 with a dimension and shape corresponding to the depicted one or more heat exchange tubes 5, see e.g. FIG. 2A. Preferably, the tubes are aligned axially. To this end, the spiral baffle is preferably provided, within each pitch, with a matching number of holes dimensioned and arranged in such a way as to allow the one or more tubes to follow an essentially straight trajectory between the first and the second tubesheet. Alternatively, the heat exchange tubes 5 may be formed around the spiral baffle 7. Provision of essentially straight heat exchange tubes, e.g. absent of U-turns, curves, and/or tube junctions, advantageously reduces pressure drop across each tube and/or improves the velocity profile of a fluid both within the tube. i.e. at the tube side, and improves the velocity profile of a fluid in contact with an outer surface of the tube, i.e. at the shell side. The shell-and-tube heat exchanger according to the invention is particularly useful as equipment of a hydrocarbon cracking furnace system; therein it is preferably configured to transfer heat from cracked hydrocarbon product to the hydrocarbon feedstock to be fed into the radiant coil of a hydrocarbon cracking furnace, e.g. as illustrated in FIG. 4. The cracked hydrocarbon product gas (the tube side fluid) generally contains coke particles, which potentially cause erosion. In order to prevent erosion, straight tubes, e.g. absent of U-turns, curves, and/or tube junctions, are preferred. Even more preferably, there is only one tube pass, such that the coke particles enter the heat exchanger from one terminal end and exit from the other terminal end without making a turn, as depicted in FIGS. 1A and B.

Likewise, it will be understood that the heat exchange tubes are preferably distributed evenly around and essentially parallel to the outlet collector pipe 4. Reference in this regard can be made to FIG. 3 depicting a cross section view along plane B-B as indicated in FIG. 2B. In particular, it can be seen that the tubes preferably do not extend inside the outlet collector pipe 4, i.e. within the interior space of the outlet collector pipe 4. In other words, the heat exchange tubes 5 are preferably exclusively distributed within the shell body and outside the outlet collector pipe.

As shown throughout the shell-and-tube heat exchanger according to the present invention can be considered to form a single shell pass design in which heat is exchanged with a tube side fluid in a single and counter-current direction. The present design advantageously allows a so called temperature cross, whereby the shell side outlet temperature exceeds the tube side outlet temperature. For example, if the shell side inlet temperature is 350° C., the required shell side outlet temperature is 600° C., the tube side inlet temperature is 800° C., and the tube side outlet temperature is 550° C., the required LMTD (log mean temperature difference) is 200° C. It was found that the LMTD can be even lower. This in contrast to double shell pass designs, as disclosed by CN106839828A and CN100386586, that have two passes on the shell side whereby heat is exchanged with a tube-side fluid. Temperature crossing is generally not possible with designs that are not operated in a countercurrent flow arrangement, such as double shell pass designs as disclosed by CN106839828A and CN100386586 that include a co-current heat exchange section.

Preferably, e.g. as shown, each heat exchange tube is a continuous tube, e.g. a single tube section stretching the length between the opposing tubesheets. Alternatively, the heat exchange tube or part of the heat exchange tubes may be formed by joined tube sections, e.g. longitudinal tube halves and/or tube sections. Forming one or more of the heat exchange tube from sections can simplify a manufacturing process, e.g. by welding tube sections between successive respective turns of the spiral baffle. Providing a continuous heat exchange tube can reduce the tube's internal surface roughness, e.g. avoiding transitions, such as welds, between joined sections. As such continuous and/or essentially straight heat exchange tube 5 are believed to reduce a fouling rate as compared to rough and/or curved tubes.

It will be understood that the position or orientation of tube-side inlet nozzle 1 and/or tube-side outlet nozzle 2 are not to be construed to be limited to the position and/or orientation shown in FIG. 1. For example, in some embodiments, the tube-side inlet nozzle 1 and tube-side outlet nozzle 2 are positioned opposite to each other such as to form an essentially straight flow path therebetween. For a given flow, straighter flow paths advantageously give rise to a lower pressure drop compared to a curvier flow path.

In a preferred embodiment, e.g. as shown, the shell-and-tube heat exchanger further comprises an inlet head 102 with a tube-side inlet nozzle 1 and tube side fluid outlet head 104 with a tube-side outlet nozzle 2, the heads provided along opposing terminal ends of the shell body 103. The first tubesheet 105, also referred to as tube-side inlet tubesheet, separates a head space defined by inlet head 102 from the shell-side space 108 defined within shell body 103. The second tubesheet 106, also referred to as tube-side outlet tubesheet, separates a head space defined by outlet head 104 from the shell-side space 108. The one or more heat exchange tubes 5 are mounted in both tubesheets, in such a way that the tube inlet head 102 space and the tube outlet head 104 are fluidly connected via at least one tube. As shown, the one or more heat exchange tubes 5 extend through the shell body 103 and across the shell-side space 108 within, from the first tubesheet 105 to the second tubesheet 106 thus defining the tube side space 107 of the shell-and-tube heat exchanger 101. In embodiments comprising a tube side fluid outlet head 104, such embodiments are preferably arranged such that the outlet collector pipe 4 also passes across the tube side fluid outlet head 104, e.g. as shown. The tube side fluid outlet head 104 may be connected, e.g. welded, to a wall of the outlet collector pipe 4 or the shell-side outlet nozzle 3. Alternatively, the tube side fluid outlet head 104 may be arranged around the outlet collector pipe or the shell-side outlet nozzle.

In another or further preferred embodiment, the collector pipe inlet is provided with a primary streamlining device 15. FIG. 2B provides a detailed view of a section of the shell-and-tube heat exchanger 101 indicated in FIG. 1B, showing such a primary streamlining device 15. In other or further preferred embodiments, the shell-and-tube heat exchanger 101, comprises a secondary streamlining device 9 that is provided to the first tubesheet 105 opposite to the collector pipe inlet 8. Both the primary and the secondary device suppress the formation of large eddies and stagnant areas at the entrance to the collector. Both streamlining devices 15, 9 are arranged to guide the shell-side fluid F2 smoothly into the outlet collector pipe 4 after passing over an end portion of the spiral baffle 7. Both streamlining devices 15, 9 further reduce, e.g. avoid, the formation of eddies and relatively stagnant areas, in particular in areas of the shell side near the first tubesheet 105. As such, each streamlining device contributes to improving heat exchanger performance by improving a flow distribution of the shell-side fluid F2 along the one or more heat exchange tubes 5, in particular at a location near the entrance to the outlet collector pipe. While primary and secondary streamlining devices may be provided individually, applicant particularly envisions a shell-and-tube heat exchanger 101 comprising both streamlining devices 15, 9 to further improve heat exchanger performance.

In one embodiment, the primary streamlining device (15) is arranged to guide the shell-side fluid (F2) into the outlet collector pipe (4).

The primary streamlining device 15 is preferably formed of an inlet piece mounted to or formed at the end to the outlet collector pipe 4 with the collector pipe inlet 8. The inlet piece is preferably shaped like a cone, or trumpet, having a sidewall that extends outwardly towards the connection between the first tubesheet 105 and the shell body 103. A cone-like or trumpet-like shape further contributes to reducing dead volume or dead space. The surface of the inlet piece is preferably arranged to smoothly guide the shell-side fluid F2, e.g. by having a wing-shaped cross-section as shown. Similar to the spiral baffle 7, the primary streamlining device 15 may be provided with holes or passages for the one or more heat exchange tubes 5, extending through it.

In a preferred embodiment, the primary streamlining device is an inlet piece having a cone or trumpet like shape so as to smoothly guide a flow of the shell-side fluid F2 into the outlet collector pipe 4. The secondary streamlining device 9 is typically a protrusion provided to or formed from the first tubesheet 105 having sidewalls that are arranged to direct a flow of shell-side fluid F2 towards the inlet of the outlet collector pipe 4.

In one embodiment, e.g. as shown in FIGS. 1A-B and 2B, the secondary streamlining device 9 can be generally described as a cone-shaped protrusion, the protrusion sidewalls are arranged to direct a flow of shell-side fluid F2, e.g. a lateral flow along the first tubesheet 105, towards the collector pipe inlet.

Accordingly, in one embodiment, the shell-and-tube heat exchanger comprises a secondary streamlining device 9 provided to the first tubesheet 105 opposite to the collector pipe inlet 8.

In a preferred embodiment, the secondary streamlining device 9 is a protrusion provided to the first tubesheet 105 at a position opposite the collector pipe inlet 8, the protrusion having sidewalls shaped so as to smoothly guide a flow of the shell-side fluid F2 in a direction along the first tubesheet 105 into the outlet collector pipe 4.

In another or further preferred embodiment, the secondary streamlining device 9 is a cone shaped protrusion.

Alternatively, or in addition, a tertiary streamlining device 16 may be provided along the inward connection at the corner between the shell body 103 and the inlet head 102, its sidewalls formed to provide an inwards sloping surface arranged to direct the shell-side fluid F2 away from the corner and towards the collector pipe inlet.

In other or further embodiments, e.g. as shown, the spiral baffle 7 is a continuous spiral baffle. A continuous spiral baffle may be understood to relate to a spiral baffle that provides a continuous essentially uninterrupted helical flow path along essentially the entire length of the baffle, preferably along essentially the entire length of the outlet collector pipe from the second tubesheet 106 towards its terminal end facing the first tubesheet 105. A continuous spiral baffle provides improved velocity distribution, or reduces eddies, and/or stagnant areas along essentially the entire length of the spiral baffle 7, as the continuous baffle avoids the wake that typically occurs downstream of the trailing edge of a segmented or spliced baffle and any other type of baffle, such as conventional impingement baffles. In embodiments with a continuous spiral baffles the shell shell-side fluid essentially passes past the baffle, i.e. smoothly along the surface of the baffle (see open-headed arrows in FIG. 1A). For non-continuous baffles, such as conventional impingement baffles or spliced spiral baffles, the fluid flow passes over or under a plate or spliced section, creating a wake.

Figure 2A:
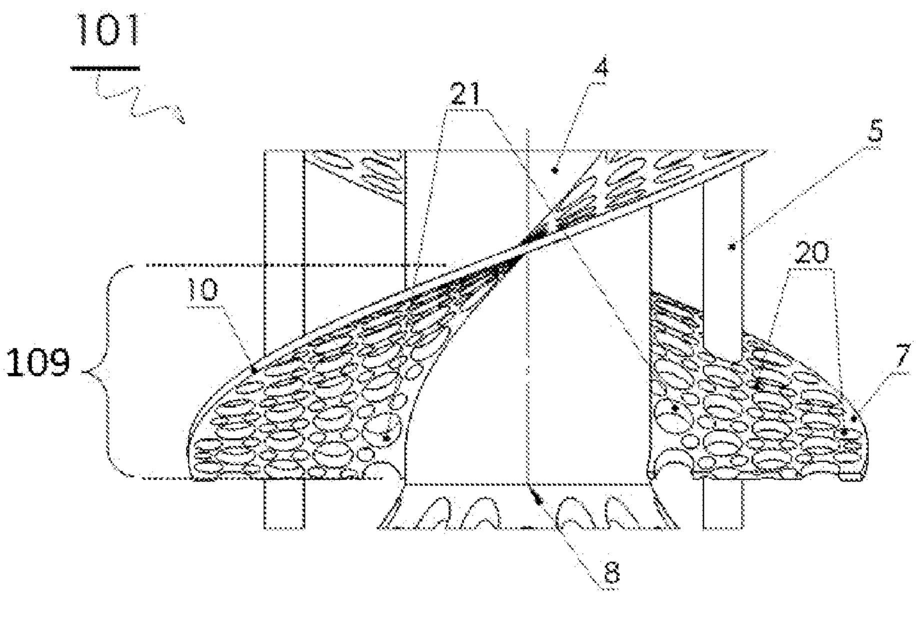
FIG. 2A and FIG. 2B depict detail views of an embodiment of the shell-and-tube heat exchanger.
Figure 2B:
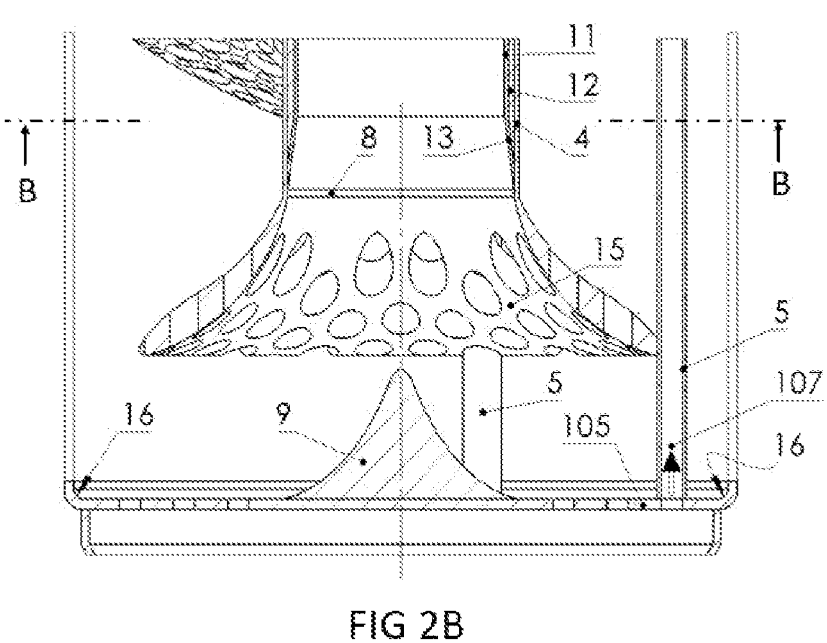
Figure 3:
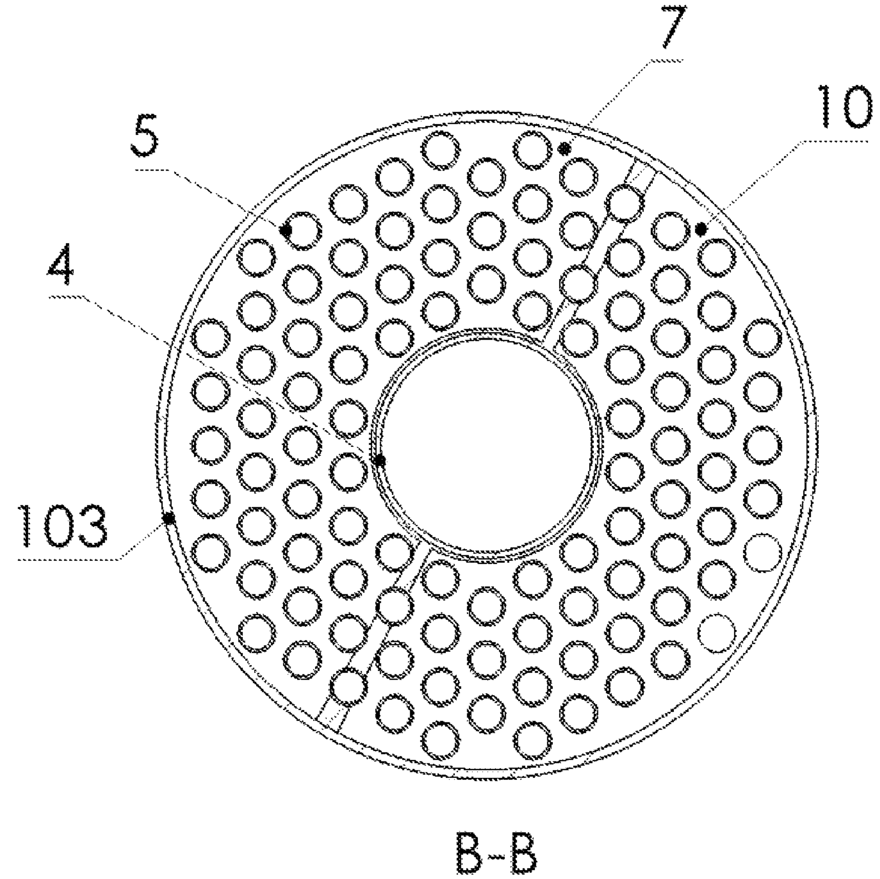
FIG. 3 illustrates a cross-sectional top view of an embodiment of the shell-and-tube heat exchanger.

In some preferred embodiments, e.g. as shown in FIG. 2A, the shell-and-tube heat exchanger comprises a plurality of spiral baffles, e.g. a primary spiral baffle 7 and secondary spiral baffle 10. Each additional spiral baffle follows a helical path with its center of rotation aligned with a center line of the shell body 103 and with the outlet collector pipe 4. Each spiral baffle is supported along its length by the outlet collector pipe 4. Each spiral baffle is shifted relative to the other spirals. Providing the shell-and-tube heat exchanger with a plurality of spiral baffles allows formation of multiple helical flows path that are separated by a spiral baffle. Providing a plurality of mutually shifted spirals may be advantageous over a system with a lower number of baffles or a single spiral baffle arranged to provide a comparable overall path length, as will be explained below. As described the first or primary baffle 7 generally starts at or close to the second tubesheet 106. For a shell-and-tube heat exchanger with two baffles, the second baffle typically starts about half a pitch away from the second tubesheet and with a 180° rotation difference relative to the first spiral. If there are three baffles, then the starting point of consecutive baffles is shifted by ⅓ pitch each away from the second tubesheet relative to the others and each baffle is rotated relative to the others around the center line at an angle of about 120°. Provision of a plurality of spiral baffles optimizes velocity distribution, suppress the formation of larger eddies and/or reduces stagnant areas within the shell side, in particular at a location near the spiral ends near the entrance to the outlet collector pipe. Each baffle results in a minimum and a maximum velocity in the inlet velocity profile of the collector pipe. The higher the number of baffles that are applied, the smaller the difference between the maximum and the minimum velocity. Especially the low velocity areas are subject to overheating and associated process medium degradation, resulting in fouling of the exchanger. Providing a higher number of baffles can avoid this. Alternatively, or in addition, provision of a plurality of spiral baffles reduces issues with harmonics, e.g. avoids destructive vibrations within the shell-and-tube heat exchanger 101. This occurs if the oscillations are at the system's natural frequency. This is avoided by changing the baffle pitch or by increasing the number of baffles. Decreasing the baffle pitch is not always feasible as the allowable pressure drop might be exceeded. In this case, increasing the number of baffles is an option.

While FIGS. 1 and 2 depict a heat-exchanger having two spiral baffles, the inventors explicitly also envision embodiments with a different number of spiral baffles, e.g. one baffle, three of four baffles.

In some preferred embodiments, e.g. as shown in detail in FIG. 2A, an end portion 109 of the one or more spiral baffles facing the first tubesheet 105, preferably all of the spiral baffles are provided with additional holes or perforations 20. An end portion provided with additional holes or perforations 20 allows at least part of the shell-side fluid to bypass that end portion. Provision of holes or perforations along an end portion, also referred to as a perforated baffle area 109, was found to improve flow velocity distribution, e.g. of the shell-side fluid F2, in particular near the entrance to collector pipe inlet 8 as compared to a situation wherein the shell-side fluid F2 passes over a final edge of an unperforated spiral baffle before entering the collector pipe inlet 8. The overall number, size of perforation and/or the length over which the perforations are provided can vary with the number of baffles. A higher number of baffles allows for a lower overall perforation. Typically, the total number and size of perforations 20 along a perforated baffle area of a given length amounts to an overall perforation of between 5 and 50% (relative to an area with the same length without such perforations). Provision of holes or perforations at the end portion of the spiral baffle 7, e.g. with 5-50% overall perforation, allows a portion of the shell-side fluid F2, e.g. at least 25 vol %, at least 50 vol %, or at least 75 vol %, to bypass the final edge and flow towards the collector pipe inlet 8 in a more evenly distributed fashion. The total bypass will generally be less than 100 vol %, in particular 90 vol % or less, more in particular 80 vol % or less, e.g. about 75 vol % or less.

In some embodiments, the end portion of the spiral baffle or baffles are perforated over a length of at least 5-50% of the baffle pitch. The baffle pitch being the span required to complete a full 360° rotation. The effect is believed to increase with increasing length of the perforated baffle area 109. For embodiments with one spiral baffle 7 an optimum length was found to be about half a pitch. For embodiments with two shifted spiral baffles an optimum length was found to be about a quarter pitch. The length for an embodiment with one baffle is usually at most about one pitch. The length for an embodiment with two baffles is usually at most about half a pitch. For embodiments with a different number of additional baffles (e.g. a total of 4 baffles) the lengths may be adjusted accordingly.

In some embodiments, e.g. as shown in FIG. 2B, the outlet collector pipe 4 is provided with a thermal insulation barrier. The thermal insulation barrier advantageously reduces heat transfer to or from the shell-side fluid F2 as it is guided through the outlet collector pipe 4. Preferably, the insulation barrier is provided along the length of the outlet collector pipe 4, i.e. from a position proximate the collector pipe inlet 8 across the second tubesheet 106 and towards the shell-side outlet nozzle 3. Most preferably, the insulation barrier is provided along substantially the entire length of the outlet collector pipe. As such, heat transfer to a shell-side fluid F2 opposite to the insulation sleeve and/or the tube-side fluid F1, e.g. in a part of outlet collector pipe 4 that extends across the tube side fluid outlet head 104, is reduced. In some embodiments, e.g. as shown, a tubular internal insulation sleeve 11 is provided along an interior surface of the pipe. Preferably, the insulation sleeve 11 enclosed a thermal insulation layer 12. This insulation sleeve 11 is attached to the outlet collector pipe 4, near the collector pipe inlet 8, via a transition piece 13 providing a gradual sloping sidewall, guiding the flow from the inlet to the sleeve. On the opposing end the shell-side outlet nozzle 3 is connected to the inner sleeve 11, e.g. by a similar transition piece or to the shell side outlet nozzle 3 (not shown).

In another or further preferred embodiment, the shell-side inlet nozzle 6 is placed tangentially with respect to the shell body 103 and is oriented such that incoming flow enters the shell body 103 with the same direction of rotation as the spiral baffle. Providing the shell-side inlet nozzle 6 tangentially to the shell body 103 was found to further improve the flow profile and assure a smooth flow path from the inlet into the spiral, such as not to disturb the flow, suppress eddy formation, and/or reduce stagnant area formation.

In some preferred embodiments, the shell body 103 is provided with one or more expansion bellows 14, in order to handle thermal expansion differences between shell-side and tube-side walls, e.g. in particular in case of a fixed tube sheet shell-and-tube heat exchanger as shown in FIG. 1. Fixing both tubesheets to the shell body, as is the case in a fixed tubesheet design, simplifies manufacturing and/or increases robustness. The heat exchange tubes are generally fixed to the tube sheets. In general, the location of the bellows is selected such as to avoid inadvertent rupture. Flexibility of the bellows is an important aspect that requires a proper selection of the construction material, which mechanical properties are subject to the local operating conditions, e.g. local temperature. In some embodiments, the one or more expansion bellows 14 are preferably positioned just downstream the shell-side inlet nozzle 6, e.g. as shown. Positioning the one or more expansion bellows 14 just downstream the inlet nozzle 6 was found to reduce bellow fouling as, during operation, the bellows are flushed by the tangential flow pattern developed by the spiral baffle and/or by the tangentially placed nozzle 6, thus reducing accumulation of foulant. In case the shell side fluid is heated up by the fluid in the tube side, this area is also a relatively colder area of the exchanger which allows selection of different, e.g. cheaper, bellow materials, compared to bellows provided along comparatively hotter areas of the heat exchanger. Further in colder areas undesired conversion, e.g. degradation, of the process medium (shell-side fluid F2) is less of an issue than at the hot end of the exchanger. In some embodiments, e.g. in case no large temperature differences are to be expected, expansion bellows are omitted.

A further aspect of the present invention pertains to a method of exchanging heat between a first fluid, e.g. a tube-side fluid F1, and a second fluid, e.g. a shell-side fluid F2, using a shell-and-tube heat exchanger 101 according to the invention. The method comprising: guiding a tube-side fluid Ell through one or more of the heat exchange tubes of the shell-and-tube heat exchanger according to the invention; and guiding a shell-side fluid F2 through the shell body 103 of the shell-and-tube heat exchanger according to the invention.

The shell-and-tube heat exchanger according to the invention is in particular advantageous to quickly cool a hot process stream, such as a cracked hydrocarbon gas, in a well-defined and controlled fashion. In such an embodiment, the tube-side fluid F1 has a higher temperature when entering the shell-and-tube heat exchanger 101 than the shell-side fluid F2. However, the invention can also be applied to cool down a shell-side fluid. In such an embodiment, the tube-side fluid F1 has a lower temperature when entering the shell-and-tube heat exchanger 101 than the shell-side fluid F2.

The fluids can be single phase (either gas, liquid or supercritical) or multiphase (e.g. a gas-liquid mixture). Preferably, the fluids on either side have the same phase, more preferably the fluids on both sides are gas phase. While FIG. 1 depicts the fluids flowing in a cross flow/counter flow arrangement it will be understood that the shell-and-tube heat exchanger 101 may also be operated in a co-current flow arrangement.

Further aspects of the present invention relate to a cracking furnace system and use of the shell-and-tube heat exchanger according to the invention as transfer line exchanger in a hydrocarbon cracking furnace system. Cracking furnace systems, as for example disclosed in document EP 17176502.7 or U.S. Pat. No. 4,479,869, generally comprises a convection section, in which hydrocarbon feedstock is preheated and/or partly evaporated and mixed with dilution steam to provide a feedstock-dilution steam mixture. The system comprises a radiant section, including at least one radiant coil in a firebox, in which the feedstock-dilution steam mixture from the convection section is converted into product and by-product components at high temperature by pyrolysis. The system further comprises a cooling section including at least one quench exchanger, for example a transfer line exchanger, configured to quickly quench the product or cracked gas leaving the radiant section in order to stop pyrolysis side reactions, and to preserve the equilibrium of the reactions in favor of the products.

It is an aim of the present invention to improve on the above-mentioned system/process. Particularly, the invention addressed coke formation problems at the shell side of the heat exchanger. The heat exchanger according to the invention allows to heat up the feedstock-dilution steam mixture without any significant overheating, such as to prevent coke formation due to feedstock degradation on the shell side of the heat exchanger. In addition, because the effluent (cracked hydrocarbon gas), flowing on the tube side, typically contains coke particles, a fixed tubesheet design is essential to prevent corrosion and to be able to clean the tube side. As with a fixed tubesheet design it is not possible to mechanically clean the shell side, fouling on the shell side is to be avoided at all costs.

Advantageously this is achieved by the shell-and-tube heat exchanger 101 according to the invention; by the method of exchanging heat between a first fluid and a second fluid according to the invention; by the use of said heat exchanger for exchanging heat between a first fluid and a second fluid; and/or by the hydrocarbon cracking furnace system 1000 as disclosed herein. In particular, this is achieved in accordance with the present invention, because of the superb flow distribution provided in a heat exchanger according to the invention, essentially without any eddies or stagnant areas that can cause overheating and subsequent fouling of the heat exchanger shell side.

Advantageously, the heat exchanger according to the invention forms part of a low emission hydrocarbon cracking system, of which a preferred configuration can be based on EP 17176502.7. Thus, the heat exchanger may advantageously be employed in an efficient hydrocarbon cracking furnace system having a reduced need for energy supply, and consequently, a reduced $CO_2$ emission.

In some preferred embodiments, as will detailed below with reference to FIG. 4, heat from the effluent (the cracked gas 208) is used directly to pre-heat the hydrocarbon feedstock 201 before entering the radiant coil 211.

FIG. 4 schematically depicts an exemplary embodiment of a hydrocarbon cracking furnace system 1000 comprising the shell-and-tube heat exchanger 101 according to the invention. The hydrocarbon cracking furnace system 1000 for converting a hydrocarbon feedstock into cracked gas as disclosed herein further comprises at least: a furnace convection section 220 with a plurality of convention banks 221 configured to receive and preheat hydrocarbon feedstock 201; a radiant section, e.g. radiant section/furnace firebox 210 including radiant coil 211 where feedstock is cracked forming cracked hydrocarbon gas flow 208. The shell-and-tube heat exchanger 101 serves as primary transfer line exchanger 235 to preheat the hydrocarbon feed before entering the radiant coil 211 and to quickly quench the product/cracked gas 208 leaving the radiant coil 211. Other components/flows comprised in the system as shown include: dilution steam 202; boiler feed water 203; high pressure steam 204; fuel gas 205; combustion air 206; flue gas 207; radiant coil 211; bottom burner 212; combustion zone (flame) 214; feed preheater 222; high temperature coil 223; dilution steam superheater 224; high pressure steam superheater 225; boiler coil 226; steam drum 233; super heater 234; and primary transferline exchanger 235. Details on the system, its components, its operation as well as alternate arrangements can be found in EP 17176502.7, which is hereby enclosed by reference, in particular embodiments and methods as shown and described in relation to embodiments shown in FIGS. 1-7 of EP 17176502.7.

In an embodiment, e.g. as presently shown in FIG. 4, the system is configured such that the hydrocarbon feedstock 201 is mixed with the dilution steam 202 and preheated before entry into the radiant coil 211. In such arrangement, the effluent, the so-called cracked gas 208, is typically guided through the tube-side space 107 of the shell-and-tube heat exchanger 101. While passing through the one or more heat exchange tubes 5, heat is transferred to the shell-side comprising the hydrocarbon feedstock 201 mixed with the dilution steam 202, thus directly preheating the feed to radiant coil 211. As shown, the feed to radiant coil 211 typically comprises a hydrocarbon feed 201 and dilution steam 202. As discussed above, benefits of the system include reduction of feedstock degradation, e.g. by avoiding pyrolysis side reactions, due to improved heat transfer, i.e. by reducing stagnant areas, by reducing eddies, and/or improving flow velocity distribution, within the shell-and-tube heat exchanger 101. Additionally, by using heat from the shell-and-tube heat exchanger 101 to preheat the feed to the radiant coil, the system advantageously has improved energy efficiency over systems wherein the heat is used indirectly, e.g. to generate steam, thus reducing a need for energy supply, and consequently reducing the system's $CO_2$ emission.

From the above it will be understood that in a preferred embodiment the shell-and-tube heat exchanger 101 is used to cool a cracked hydrocarbon process stream 208. In particularly preferred embodiments, the shell-and-tube heat exchanger 101 is additionally used to preheat the feed to the radiant coil 211. Accordingly, in some embodiments the method of exchanging heat between a first fluid and a second fluid, comprises guiding tube-side and shell-side fluids through respectively the tube-side space 107 and the shell-side space 108 of the heat exchanger, e.g. guiding a tube-side fluid F1 through the one or more of the heat exchange tubes of the shell-and-tube heat exchanger according to the invention and guiding a shell-side fluid F2 through the shell body 103 of said heat exchanger. In a preferred embodiment, one of the tube-side fluid F1 and the shell-side fluid F2, is a cracked gas 208 exiting the radiant coil 211 of a hydrocarbon cracking furnace system 1000. More preferably, e.g. as in the embodiment shown in FIG. 4, heat from the cracked hydrocarbon gas flow 208 is directly transferred to the hydrocarbon feed/dilution steam mixture flowing to the radiant coil 211. Accordingly, the method preferably comprises: guiding a cracked gas 208 through the tube-side space 107 of the heat exchanger; and guiding a hydrocarbon feedstock/dilution steam mixture to the radiant coil 211 through the shell-side space 108 of the heat exchanger.

As detailed herein, the exchanger 101 according to the invention may be used to particular advantage as transfer line exchanger in a hydrocarbon cracking furnace system, e.g. replacing one or more of the transfer line exchangers in embodiments of the hydrocarbon cracking furnace systems 1000 depicted in FIGS. 1-5 of EP 17176502.7, or of a cracking furnace system according to WO 2018/229267, or of a cracking furnace system according to International application number PCT/EP2020/067173; the contents of these applications are incorporated by reference, in particular the claims, Figures and descriptions of the Figures. The hydrocarbon cracking furnace system comprises at least a radiant coil 211 for cracking the hydrocarbon feedstock and the shell-and-tube heat exchanger 101 according to the invention, which is fluidly connected to the radiant coil located in said furnace firebox. In a preferred embodiment, the tube-side space 107 and the shell-side space 108 are each fluidly connected to opposing ends of the radiant coil such as to simultaneously cool the hydrocarbon gas flow exiting the radiant coil and to preheat the feed to the radiant coil.

For the purpose of clarity and a concise description, features are described herein as part of the same or separate embodiments, however, it will be appreciated that the scope of the invention may include embodiments having combinations of all or some of the features described.

For example, while embodiments were shown for a shell-and-tube heat exchanger comprising two continuous spiral baffles, each with a perforated baffle area 109, also alternative ways may be envisaged by those skilled in the art having the benefit of the present disclosure for achieving a similar function and result. The various elements of the embodiments as discussed and shown offer certain advantages, such as provision of a shell-and-tube heat exchanger having an improved flow distribution and/or otherwise improved performance, e.g. in terms of fouling, over known shell-and-tube heat exchangers. Of course, it is to be appreciated that any one of the above embodiments or processes may be combined with one or more other embodiments or processes to provide even further improvements in finding and matching designs and advantages. It is appreciated that this disclosure offers particular advantages for cooling of a cracked hydrocarbon gas flow 208, and in general can be applied for any application benefitting from improved, preferably even near perfect, shell-side flow distribution and improved heat exchange between fluids.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The project leading to this application has received funding from the European Union Horizon H2020 Programme (H2020-SPIRE-2016) under grant agreement no 723706.

LIST OF REFERENCE NUMERALS shell-and-tube heat exchanger (101);
hydrocarbon cracking furnace system (1000);
tube-side fluid (F1);
shell-side fluid (F2);
tube-side inlet nozzle (1);
tube-side outlet nozzle (2);
shell-side outlet nozzle (3);
outlet collector pipe (4);
heat exchange tube (5);
shell-side inlet nozzle (6);
spiral baffle (7);
collector pipe inlet (8);
secondary streamlining device (9);
additional spiral baffles (10);
insulation sleeve (11);
insulation layer (12);
transition piece (13);
expansion bellow (14);
primary streamlining device (15);
tertiary streamlining device (16);
additional holes or perforations (20);
tube side fluid inlet head (102);
shell body (103);
tube side fluid outlet head (104);
first tubesheet (105);
second tubesheet (106);
tube-side space (107);
shell-side space (108);
perforated baffle area (109);
hydrocarbon feedstock (201);
dilution steam (202);
boiler feed water (203);
high pressure steam (204);
fuel gas (205); (combustion) air (206);
flue gas (207);
cracked gas (208);
boiler water (209*a*);
partly vaporized boiler water (209*b*);
radiant section/furnace firebox (210);
radiant coil (211);
bottom burner (212);
combustion zone (flame) (214);
furnace convection section (220);
convection bank (221);
feed preheater (222);
high temperature coil (223);
dilution steam superheater (224);
high pressure steam superheater (225);
boiler coil (226);
steam drum (233);
de-super heater (234);
primary transferline exchanger/shell-and-tube heat exchanger (235).

The invention claimed is:

1. A shell-and-tube heat exchanger for exchanging heat between a tube-side fluid and a shell-side fluid comprising:

a first tubesheet;

a second tubesheet;

a shell body that is fitted with a shell-side inlet nozzle, opposing terminal ends of the shell body bordered by the first tubesheet and the second tubesheet;

one or more heat exchange tubes that extend through the shell body from the first tubesheet to the second tubesheet; and a spiral baffle following a helical trajectory with its center of rotation substantially aligned with a center line of the shell body, the spiral baffle arranged to provide a helical flow path through the shell body downstream the shell-side inlet nozzle towards the first tubesheet; and an outlet collector pipe that extends substantially coaxially within the shell body and that supports the spiral baffle along its length, such that the helical flow path is guided along an outer surface of the outlet collector pipe, wherein the outlet collector pipe is mounted to and passes through the second tubesheet, and wherein the outlet collector pipe is separated from the first tubesheet by a gap downstream the helical flow path to allow the shell-side fluid (FA) to enter an inlet of the collector pipe, which collector pipe inlet faces the first tubesheet across the gap, and to exit the shell body via a shell-side outlet nozzle provided on a terminal end of the outlet collector pipe opposite to the collector pipe inlet.

2. The shell-and-tube heat exchanger according to claim 1, wherein the collector pipe inlet is provided with a primary streamlining device having a cone or trumpet like shape so as to smoothly guide the shell-side fluid into the outlet collector pipe.

3. The shell-and-tube heat exchanger according to claim 1, wherein the spiral baffle is a continuous spiral baffle providing a continuous helical flow path along essentially the entire length of the outlet collector pipe from the second tubesheet towards the first tubesheet.

4. The shell-and-tube heat exchanger according to claim 1, wherein an end portion of the spiral baffle facing the first tubesheet is provided with holes or perforations allowing the shell-side fluid to at least partly bypass the end portion.

5. The shell-and-tube heat exchanger according to claim 1, further comprising a secondary streamlining device comprising a protrusion provided to the first tubesheet opposite to the collector pipe inlet, the protrusion shaped as to smoothly guide a flow of the shell- side fluid in a direction along the first tubesheet into the outlet collector pipe.

6. The shell-and-tube heat exchanger according to claim 1, wherein the outlet collector pipe is provided with a thermal insulation barrier.

7. The shell-and-tube heat exchanger according to claim 1, wherein the shell-and-tube heat exchanger comprises one or more additional spiral baffles.

8. The shell-and-tube heat exchanger according to claim 1, wherein the shell-side inlet nozzle is placed tangentially with respect to the shell body.

9. The shell-and-tube heat exchanger according to claim 1, wherein the shell body is provided with one or more expansion bellows.

10. The shell-and-tube heat exchanger according to claim 1, wherein opposite ends of the one or more heat exchange tubes respectively open into a tube side fluid inlet head and a tube side fluid outlet head.

11. A method of exchanging heat between a first fluid and a second fluid, the method comprising guiding a tube-side fluid through one or more of the heat exchange tubes of the shell-and-tube heat exchanger according to claim 1; and guiding a shell-side fluid through the shell body of the shell-and-tube heat exchanger.

12. The method according to claim 11, wherein the shell-and-tube heat exchanger is used as a transfer line exchanger in a hydrocarbon cracking system.

13. The method according to claim 12, wherein the tube-side fluid is a cracked hydrocarbon process stream exiting a radiant coil of a cracking furnace system, and wherein the shell-side fluid (2) comprises a hydrocarbon feedstock feeding said radiant coil.

14. A hydrocarbon cracking furnace system comprising a furnace firebox, wherein a radiant coil is provided for cracking a hydrocarbon feedstock, and a shell-and- tube heat exchanger according to claim 1, fluidly connected to the radiant coil, located in said furnace firebox.

15. The hydrocarbon cracking furnace system according to claim 14, wherein the shell-and-tube heat exchanger has a tube-side space and a shell-side space, which are each fluidly connected to opposing ends of the radiant coil, configured to simultaneously cool a hydrocarbon gas flow exiting the radiant coil and to preheat the feed to the radiant coil.

16. The hydrocarbon cracking furnace system according to claim 14, wherein the shell-and-tube heat exchanger is mounted essentially vertically and/or wherein the second tubesheet is positioned above the first tubesheet.

17. The method according to claim 12, wherein the shell-side fluid is a hydrocarbon feedstock-diluent mixture.

18. The method according to claim 12, wherein the shell-side fluid is a hydrocarbon feedstock-dilution steam mixture.

* * * * *